TELEVISION FILM SCANNING SYNCHRONIZING SYSTEM

Filed Dec. 21, 1964 2 Sheets-Sheet 1

INVENTORS.
PETER C. GOLDMARK,
ABRAHAM A. GOLDBERG &
SAUL M. DECKER
Brumbaugh, Free, Graves & Donohue
their ATTORNEYS Sept. 17, 1968 P. C. GOLDMARK ET AL 3,402,260

TELEVISION FILM SCANNING SYNCHRONIZING SYSTEM

Filed Dec. 21, 1964 2 Sheets-Sheet 2

INVENTORS.
PETER C. GOLDMARK,
ABRAHAM A. GOLDBERG &
SAUL M. DECKER

Brumbaugh, Free, Graves & Donohue
their ATTORNEYS

United States Patent Office 3,402,260

Patented Sept. 17, 1968

3,402,260
TELEVISION FILM SCANNING SYNCHRONIZING SYSTEM

Peter C. Goldmark, Abraham A. Goldberg, and Saul M. Decker, Stamford, Conn., assignors to Columbia Broadcasting System, Inc., New York, N.Y., a corporation of New York Filed Dec. 21, 1964, Ser. No. 419,763
7 Claims. (Cl. 178—7.2)

ABSTRACT OF THE DISCLOSURE

A system for synchronizing the scanning of a film strip containing synchronizing indicia to maintain in synchronization the film scanner, the film and a kinescope for reproducing the information recorded on the film, in which the scanner scans the film with a raster scan and a light source directs a beam in the path of the synchronizing indicia, both the raster and the light beam being directed to the photosensitive means through a common lens. The vertical deflection signals for the kinescope and the scanner are derived from a vertical deflection oscillator whose frequency is variable in accordance with a control signal. Synchronizing signals corresponding to movement of the synchronizing indicia through the path of the light beam are separated from the video signal and directed to a phase splitter producing synchronizing signals of opposite polarity. Those synchronizing signals are compared in a phase detector with a sawtooth wave derived from the vertical deflection circuit to develop the control signal, which is delayed, or integrated, prior to application to the vertical deflection oscillator.

The present invention relates to systems for reproducing on conventional television receiver apparatus information recorded on a record medium. More specifically, it has to do with means in a system of this character for maintaining synchronism between the moving film record and a succession of scanning fields in the television receiver.

The copending application Ser. No. 330,193, filed Dec. 12, 1963, now Patent No. 3,333,058, by Peter C. Goldmark and John M. Hollywood, discloses film record reproducing equipment in which synchronizing indicia on a film record are used to maintain synchronism between frames recorded on the film and successive fields in a television reproducer. In one embodiment, signals derived by scanning the indicia recorded on the film are utilized to initiate the vertical scanning function in the television receiver. As a result, synchronism is maintained even though the film speed may vary. The present application is addressed to novel and highly effective circuitry for thus maintaining synchronism in a system of this general character.

In accordance with the invention, pulses derived from synchronization marks associated with the respective frames on the film and periodically varying signals representative of the vertical deflection timing in a television receiver are compared and an error signal is generated in response to any change of phase between the two groups of signals. This error signal, averaged over a predetermined interval of time, is utilized to control the bias voltage of an oscillator or multivibrator having a period which is a function of the bias thereon, and which establishes the vertical deflection timing in the television receiver.

In addition, a small amount of the synchronizing signal derived from the synchronizing indicia on the film is applied directly to the control electrode of the multivibrator to compensate for sudden irregularities in synchronism resulting from time displacement errors of the film or "flutter" from the mechanism used to transport the film, for example.

It will be understood, therefore, that the average vertical timing in the television receiver will automatically be changed in response to slow changes in film speed, while the instantaneous vertical timing will automatically be altered in response to sudden irregularities, so that synchronism will be maintained.

For a better understanding of the invention, reference is made to the following detailed description of a typical embodiment, taken in conjunction with the accompanying drawings, in which.

Figure 1:
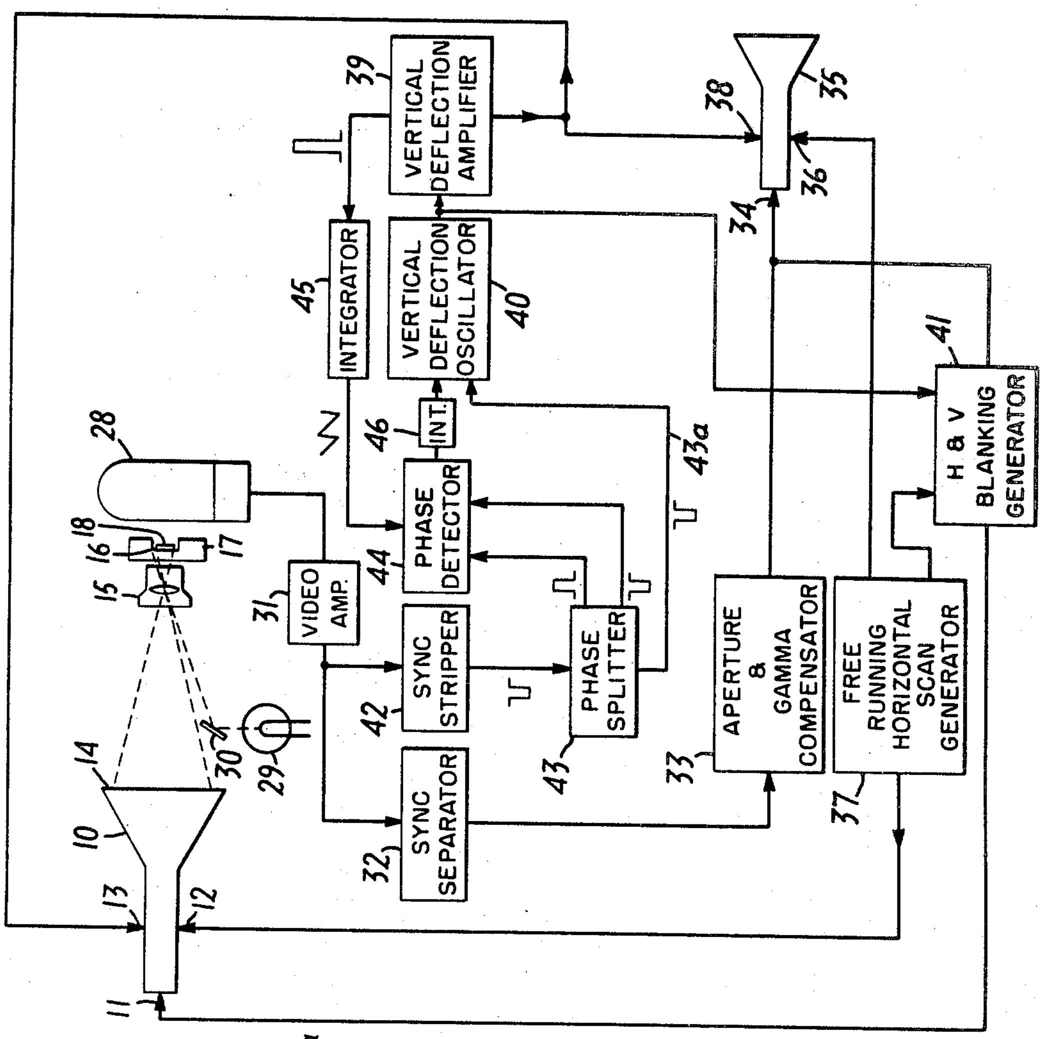
FIG. 1 is a schematic diagram of film reproducer apparatus embodying synchronizing means according to the invention.

Referring to FIG. 1, film reproducer apparatus, according to the invention, includes a conventional cathode ray tube 10 having an electron beam control terminal 11 and horizontal and vertical deflection terminals 12 and 13, respectively. The electron beam in the tube 10 is adapted to be deflected as described in greater detail below to trace on the screen 14 a conventional scanning raster of uniform light intensity. Typically, the raster may comprise 525 horizontal lines produced at a rate of 15,750 lines per second and forming 60 fields per second, as in the conventional United States television practice.

The raster formed on the screen 14 of the tube 10 is focussed by conventional lens means 15 on a scanning area 16 formed by a filmgate 17 through which a film 18 is adapted to be continuously transported. The film 18 is adapted to be transported in a direction normal to the paper from a supply reel to a takeup reel (not shown), transport being effected by a capstan pressure roller mechanism (not shown) of the kind commonly employed in magnetic tape recorders.

Figure 2:
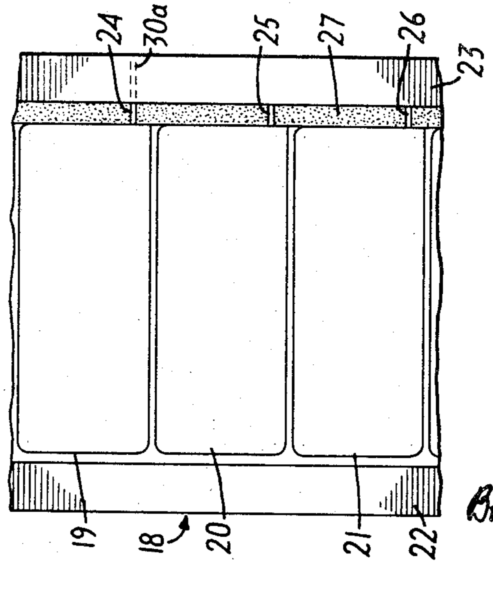
FIG. 2 illustrates a film record which is usable in the film reproducer apparatus of FIG. 1.

The film 18 may be of the type disclosed in the aforementioned copending application Ser. No. 330,193. As shown in FIG. 2, it comprises a succession of frames 19, 20 and 21, each containing picture information with one or more soundtracks 22 and 23 formed adjacent the edges of the film. For synchronizing purposes, as will be described in greater detail hereinafter, a plurality of synchronizing indicia 24, 25 and 26 are formed in a narrow track 27 which lies between the frames 19, 20 and 21 and the soundtrack 23. Preferably, the indicia 24, 25 and 26 comprise narrow light transmitting slits formed in an opaque background, as shown.

Preferably, the film 18 is scanned in accordance with the technique disclosed in the copending application Ser. No. 268,911, filed Mar. 29, 1963, by Bernard Erde, for "Film Scanning." Thus, the height of the scanning raster on the screen of the tube 10 in the direction of film movement is twice the pitch distance between frames and the film is moved at a rate such that each frame is completely scanned during each raster scansion. Moreover, the raster scan travels in the same direction as the record medium so that the record medium or film 18 carries its information in erect orientation, i.e., with the bottom of the frame at the leading edge with respect to the direction of motion rather than inverted as, for example, in conventional motion picture film.

The light passing through the film 18 during the scanning operation falls on a photomultiplier tube 28 which generates electrical signals comparable to the well-known video signals developed in a television broadcasting system.

As the film 18 is transported through the filmgate 17, the track 27 is continuously illuminated by light from a lamp 29 which falls on a reflector 30 and is directed through the lens means 15 to a light slit 30*a* (FIG. 2) formed in the filmgate 17. As the slit-like synchronizing indicia 24, 25 and 26 move past the illuminated slit 30*a*, light pulses are produced which fall on the photomultiplier tube 28 and generate synchronizing pulses at a rate of 60 pulses per second for the conditions of operation assumed above.

The composite video signal in the output of the photomultiplier tube 28 is supplied through a video amplifier 31 to a conventional synchronizing signal separator 32 which removes the synchronizing information and passes only the video information. The video signal from the separator 32 is fed through an aperture and gamma compensator device 33 to the beam intensity control terminal 34 of a television receiver picture tube 35.

The picture tube 35 has horizontal deflection terminals 36 connected to receive horizontal deflection signals from a free-running, horizontal scan generator 37 which also supplies horizontal deflection signals to the horizontal deflection signal terminals 12 of the scanning cathode ray tube 10. In similar fashion, the tube 35 has vertical deflection terminals 38 connected to receive vertical deflection signals from a conventional vertical deflection amplifier 39 which receives a vertical deflection input signal from a conventional vertical deflection oscillator 40. The vertical deflection amplifier 39 also supplies vertical deflection signals to the vertical deflection terminals 13 of the tube 10.

The outputs of the vertical deflection oscillator 40 and the free-running horizontal scan generator 37 are also supplied to a conventional horizontal and vertical blanking generator 41 which provides horizontal and vertical blanking signals to the beam control electrodes 11 and 34 of the scanning cathode ray tube 10 and the receiver tube 35.

Synchronism between the successive fields generated by the receiver tube 35 and the scanning cathode ray tube 10 and the rate of movement of the film 18 is maintained by utilizing the synchronizing signals derived from the synchronizing indicia 24, 25 and 26 on the film 18 to initiate vertical scan in both tubes. To this end, the output of the video amplifier 31 is also supplied to a synchronizing signal stripper device 42 which strips off the synchronizing signals and supplies them to a phase splitter 43. The phase splitter 43 converts the stripped synchronizing pulses to like pulses of opposite polarity and supplies them to a phase detector 44 which also receives from an integrator 45 a saw-tooth wave input produced by integrating the usual peaked saw-tooth output signal from the vertical deflection amplifier 39.

So long as the field scanning rate and the film frame rate are in synchronism, the phase detector 44 provides a predetermined control signal to the vertical deflection oscillator 40 which causes it to operate at the proper frequency to maintain synchronism. However, any increase or decrease in the average speed of the film 18 will produce a corresponding increase or decrease in the control voltage output of the phase detector 44 which will automatically adjust the frequency of oscillation of the vertical deflection oscillator 40 so as to restore synchronism.

Preferably, a conventional time delay circuit 46 should be interposed between the phase detector 44 and the vertical deflection oscillator 40 so that the control voltage supplied to the vertical oscillator 40 will change only when there is a change in the average speed of transport of the film 18. With this arrangement, it will be understood that the succession of fields generated by both the receiver tube 35 and the scanning cathode ray tube 10 will automatically be maintained in synchronism with the average speed of the film 18.

In order to compensate for sudden irregularities in synchronism attributable to factors such as time displacement errors of the film 18, or flutter caused by film transport mechanism, synchronizing pulses at reduced amplitude are supplied directly from the phase splitter 43 to the vertical deflection oscillator 40 over a conductor 43*a*.

Figure 3:
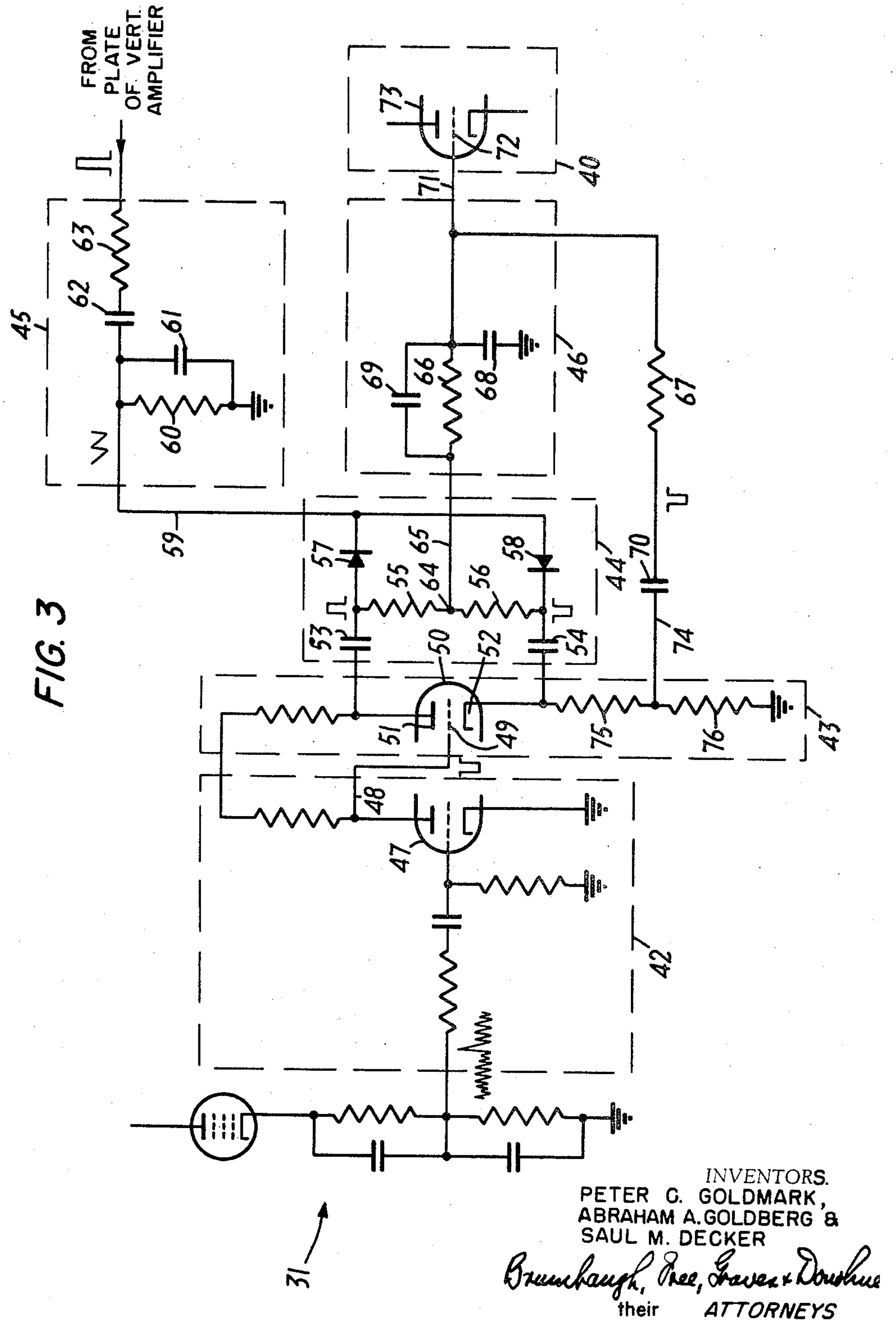
FIG. 3 illustrates in greater detail certain of the components of the system shown in FIG. 1.

As shown in greater detail in FIG. 3, the synchronizing signal stripper device 42 may comprise a conventional electron tube circuit including a tube 47 biased so that the blanking level falls at or below the cutoff point on the dynamic characteristic with the video signal component extending from cutoff in the nonconducting direction so that it is not reproduced. The synchronizing signals, which extend from the cutoff level in the direction of increasing conduction, are passed through the conductor 48 to the control grid 49 of an electron tube 50 connected as a conventional phase splitter 43. Like signals of opposite polarity are supplied from the anode 51 and the cathode 52 of the tube 50 through capacitors 53 and 54, respectively, to the series connected resistors 55 and 56, respectively, in the phase detector 44.

The outer terminals of the resistors 55 and 56 are connected through oppositely poled rectifiers 57 and 58, respectively, to a conductor 59 over which is supplied a saw-tooth wave of sharp slope from the integrator 45. The integrator 45 includes a shunt resistor 60 and capacitor 61 in parallel and a series capacitor 62 and series resistor 63 connected to receive peak pulses from the output of the vertical amplifier 39.

The junction 64 between the resistors 55 and 56 in the phase detector 44 is connected by a conductor 65 to the time delay circuit 46 which includes a series resistor 66, a shunt capacitor 68 and a capacitor 69 connected in shunt with the resistor 66. The values of these circuit elements are selected to insure that only outputs from the phase detector 44 representative of a change in the average speed of the film 18 will be transmitted to the vertical deflection oscillator 40.

The output of the time delay circuit 46 is fed over a conductor 71 to the control grid 72 of an electron tube 73 in the vertical deflection oscillator 40 which may be a conventional control voltage responsive multivibrator adapted to oscillate at a frequency determined by the voltage applied to the control grid 72.

A portion of the synchronizing pulse output of the phase splitter 43 is supplied directly to the grid 72 of the tube 73 through a blocking capacitor 70, a resistor 67 and a conductor 74 which is connected to the junction between a pair of series connected cathode resistors 75 and 76 for the tube 50 in the phase splitter device 43. The values of these resistors are selected so that the amplitude of the direct synchronizing signal fed to the grid 72 of the tube 73 will be just sufficient to compensate for any sudden irregularity in the speed of the film 18 that may occur. The resistor 67 and the capacitor 68 form an integrating network which removes some of the high frequency components of the vertical signals and insures more stable synchronization.

For proper operation, the film 18 is transported at a speed such that scanning of the indicia 24, 25 and 26 will produce synchronizing pulses at a rate of approximately 60 pulses per second and the height of the raster on the face 14 of the cathode ray tube 10 is adjusted to be twice the frame pitch distance. Since the raster scan on the face of the tube 10 is in the same direction as the film movement, as each frame passes through the scanning zone 16, it will be subjected to a complete raster scan by the tube 10.

The opposite pulses from the phase splitter 43 are utilized in the phase detector 44 to sample the sharp, positive going slope of the saw-tooth waves from the integrator 45 and to produce at the conductor 65 output pulses whose magnitudes depend on the phase relation between the two inputs to the phase detector 44. The time delay circuit 46 integrates the pulse output from the phase detector 44 and supplies to the vertical deflection oscillator 40 a D.C. bias whose magnitude varies with the phase difference between the two inputs to the phase detector 44.

So long as the raster scan traced by the beam on the face 14 of the tube 10 is in synchronism with the rate of movement of the film 18, the phase detector 44 will supply a control voltage to the vertical oscillator 14 of appropriate value to maintain this raster scan rate. If, however, the average speed of the film 18 increases or decreases, the phase detector 44 will eventually change the control bias applied to the vertical deflection oscillator 40 through the time delay circuit 46 so as to increase or decrease its frequency of oscillation, thereby maintaining the desired condition of synchronism.

In the event sudden short time variations in the speed of the film occur (i.e., so-called "jitter"), they will be compensated for by the synchronizing pulses supplied directly from the phase splitter 43 to the voltage control electrode 72 of the vertical deflection oscillator 40.

It will be apparent, therefore, that the invention provides a novel and highly effective system for maintaining synchronism between frames on a moving film and a succession of fields generated by a cathode ray tube. By employing phase detector means to sense any change in phase between synchronizing signals derived from the film and synchronizing signals applied to the tube, and utilizing the error signal produced thereby to control the vertical deflection frequency, synchronism between the tube scanning field rate and the average speed of the film can readily be maintained. Also, by supplying small magnitude synchronizing signals derived from the film directly to the frequency control electrode of the vertical deflection signal generator, compensation can also be effected for sudden irregularities in the speed of the film.

The specific embodiment described herein and shown in the drawings is obviously susceptible of modification in form and detail within the scope of the invention. Accordingly, the latter is not to be limited to the specific devices disclosed but is intended to encompass all such modifications as come within the scope of the following claims.

We claim:

1. In apparatus for reproducing information recorded in a succession of frames on a record strip having longitudinally spaced apart synchronizing indicia in predetermined relation to the frames, the combination of:
- means for transporting the strip through a scanning zone;
- means for subjecting the strip in said zone to a series of mutually displaced transverse scan lines executed in succession in the direction of movement of the strip;
- means for directing a radiant energy beam in the path of the synchronizing indicia during movement of the strip;
- detection means responsive to the scanning beam and to the radiant energy beam modified by the information contained in the frames and the synchronizing indicia, respectively, for generating first signals representative of such information and second signals representative of the rate at which the frames are moved through the scanning zone;
- scanning signal generator means for establishing the rate at which the scanning means scans the frames of the strip, said rate being variable in response to a control signal supplied thereto;
- means responsive to the output of said generator means for producing a sawtooth wave of the same frequency;
- phase splitter means responsive to said second signals for producing synchronizing signals in synchronism with said second signals; and
- phase detector means jointly responsive to said sawtooth wave and to said synchronizing signals for producing said control signal representative of phase variations between the two.

2. Reproducing apparatus as defined in claim 1 in which the scanning means includes:
(a) second deflection signal generator means,
(b) a cathode ray tube having
(1) an electron beam;
(2) first deflection means connected to said second deflection generator means to deflect said beam to produce said line scans, and
(3) second deflection means connected to said control signal responsive signal generator means to displace said successive line scans and produce said raster.

3. Reproducing apparatus as defined in claim 2 together with a television picture tube having
(a) beam control electrode means responsive to said first signals,
(b) first beam deflection means energized by said second deflection signal generator means to produce a succession of line scans in synchronism with the line scans produced on the screen of said cathode ray tube, and
(c) second beam deflection means responsive to said control signal responsive scanning signal generator means for displacing said television picture line scans to produce a raster synchronized with the raster on said cathode ray tube.

4. Reproducing apparatus as defined in claim 1 together with time delay means interposed between said phase detector means and said control signal responsive scanning signal generator means.

5. Reproducing apparatus as defined in claim 4, together with means for supplying signals representative of said second signals to said control signal responsive signal generator means.

6. In apparatus for reproducing information recorded in a succession of frames in a record strip having longitudinally spaced apart synchronizing indicia in predetermined relation to the frames, the combination of:
- means for transporting the strip through a scanning zone,
- means for subjecting the strip in such zone to a series of mutually displaced transverse scan lines executed in succession in the direction of movement of the strip,
- photosensitive means,
- optical means interposed between said scanning means and said strip for directing to said photosensitive means radiant energy from the scan lines as modified by information recorded in the frames of the strip,
- means for producing a radiant energy beam directed in the path of the movement of the synchronizing indicia through said optical means to the photosensitive means, the photosensitive means developing a composite signal containing a video signal representing the information recorded in the frames of the strip and synchronizing pulses representative of the rate at which the frames move through the scanning zone,
- means for extracting from said composite signal the video and synchronizing pulse signals,
- vertical scanning signal generator means for establishing the rate at which the scanning means scans the frames of the strip,
- phase detector means jointly responsive to a signal at the frequency of the scanning signal generator means and to the extracted synchronizing signals for producing a control signal, and
- means for supplying said control signal to the scanning signal generator means for regulating the frequency thereof.

7. Apparatus according to claim 6, further comprising:
a television picture tube connected to receive the extracted video signal for reproducing the information recorded in the frames of the strip in a like series of transverse scan lines, vertical deflection signal means responsive to the scanning signal generator means for imparting vertical deflection to the scanning lines in said scanning means and said television picture tube means, and horizontal scanning signal generator means connected to said scanning means and said television picture tube means for producing said transverse scan lines of said scanning means and television picture tube means in synchronism.

References Cited

UNITED STATES PATENTS 2,189,351 2/1940 Schroter ____________ 178—7.2

FOREIGN PATENTS 136,936 4/1950 Australia.

ROBERT L. GRIFFIN, *Primary Examiner.*

R. L. RICHARDSON, *Assistant Examiner.*